US012478559B2

(12) United States Patent
Hong

(10) Patent No.: US 12,478,559 B2
(45) Date of Patent: Nov. 25, 2025

(54) ANTI-COLIC BABY BOTTLE

(71) Applicant: Ying Hong, Wuxi (CN)

(72) Inventor: Ying Hong, Wuxi (CN)

( * ) Notice: Subject to any disclaimer, the term of this patent is extended or adjusted under 35 U.S.C. 154(b) by 75 days.

(21) Appl. No.: 18/356,235

(22) Filed: Jul. 21, 2023

(65) Prior Publication Data

US 2023/0355480 A1 Nov. 9, 2023

(30) Foreign Application Priority Data

Jul. 22, 2022 (CN) ........................ 202221910798.X

(51) Int. Cl.
*A61J 9/04* (2006.01)
*A61J 11/00* (2006.01)

(52) U.S. Cl.
CPC ............... *A61J 9/04* (2013.01); *A61J 11/002* (2013.01)

(58) Field of Classification Search
CPC .................................. A61J 9/04; A61J 11/002
USPC ........................................................ 215/11.5
See application file for complete search history.

(56) References Cited

U.S. PATENT DOCUMENTS 2,061,477 A * 11/1936 Perry ...................... A61J 9/006 215/11.5
3,059,797 A * 10/1962 Wilkinson ............... A61J 11/02 215/11.1
5,269,425 A * 12/1993 Gomez-Acevedo ...... A61J 9/00 215/11.4
5,570,796 A * 11/1996 Brown ...................... A61J 9/04 215/11.1
6,499,615 B1 * 12/2002 Szieff ........................ A61J 9/00 215/11.1
7,150,370 B2 * 12/2006 Pyun ....................... A61J 9/006 215/11.4
7,537,128 B2 * 5/2009 Nachumi ................. A61J 9/04 215/11.1
8,479,934 B2 * 7/2013 Brown ...................... A61J 9/04 215/11.1
8,733,565 B1 * 5/2014 Boonprasop ............. A61J 11/02 215/11.4
10,138,034 B2 * 11/2018 Brown .................. B65D 47/32
2003/0226816 A1 12/2003 Kipperman et al.
2008/0099422 A1 * 5/2008 Rees ........................ A61J 11/02 215/11.5
2009/0200257 A1 * 8/2009 McKendry ............... A61J 11/02 215/11.5
2016/0213573 A1 7/2016 Rosskamm
2016/0262985 A1 * 9/2016 Fan .......................... A61J 9/04

(Continued)

FOREIGN PATENT DOCUMENTS

WO WO-2020141186 A1 * 7/2020 ............. A61J 11/02

*Primary Examiner* — Don M Anderson
*Assistant Examiner* — Justin Caudill
(74) *Attorney, Agent, or Firm* — Zhigang Ma

(57) ABSTRACT

The present disclosure discloses an anti-colic baby bottle, including a bottle body and a nipple mounted in the bottle body through a threaded fixing ring; the nipple is provided with a thickened portion; an anti-colic separation sheet is arranged between the bottle body and the nipple; an air inlet is formed in the thickened portion of the nipple; the anti-colic separation sheet is connected with an air guide pipe which correspondingly adapts to the air inlet and extends into the bottle body; the air guide pipe and a sucking end of the nipple are symmetrically arranged on two sides of the bottle body in a radial direction.

7 Claims, 3 Drawing Sheets

(56) References Cited

U.S. PATENT DOCUMENTS

| | | | |
|---|---|---|---|
| 2019/0110956 A1 | 4/2019 | Smith et al. | |
| 2019/0380915 A1* | 12/2019 | Shastri | A61J 11/002 |

* cited by examiner

ANTI-COLIC BABY BOTTLE

CROSS-REFERENCE TO RELATED APPLICATIONS

This application claims priority benefits to Chinese Patent Application No. CN202221910798.X filed Jul. 22, 2022. The contents of the application are incorporated herein by reference.

TECHNICAL FIELD

The present disclosure relates to the technical field of mother and baby products, and in particular, to an anti-colic baby bottle.

BACKGROUND

An anti-colic baby bottle is also referred to as anti-vomiting baby bottle. Due to a special design of the baby bottle, when a baby is fed with the baby bottle, inhalation of air can be effectively reduced, thereby reducing symptoms such as colic, hiccup, and vomiting of the baby. There are two kinds of anti-colic baby bottles on the market. One kind is a bottom-ventilating type anti-colic baby bottle, the bottom of which can be opened. Air intake and air exhaust are achieved by a bottom ventilation valve. The other kind is a guide pipe-ventilating type anti-colic baby bottle. A special air guide pipe is used to guide air outside the bottle directly to the bottom of the bottle. The existing anti-colic baby bottles on the market are usually provided with a one-way air inlet valve on a side surface of a nipple, and the air outside the baby bottle enters the baby bottle through the valve, thereby reducing a vacuum negative pressure inside the baby bottle. However, in an actual use process, this kind of baby bottle has a low intake rate and still has the risk of colic. In addition, after entering the baby bottle, the air is guided to a position above a liquid level through an air guide pipe to avoid mixing between the air and milk. However, when there is less milk in the baby bottle, a baby still easily inhales the air inside the baby bottle.

Patent 202221910798X discloses a dual anti-colic baby bottle. A second one-way valve component is arranged between an air inlet pipe and a nipple to maintain a balance between an internal pressure and an external pressure of the baby bottle and ensure that the milk in the baby bottle can be sucked out normally. However, in a feeding process, when the baby bottle tilts, it is inevitable that some milk will enter the air guide pipe and flow back into the second one-way valve component, which may cause leakage. The milk flows back into the air guide pipe sand the second one-way valve component, which will increase the difficulty of cleaning and cause hygienic dead angles. As a result, the baby bottle is not cleaned thoroughly, and bacteria grow, so that babies get sick.

SUMMARY

To this end, the present disclosure provides an anti-colic baby bottle to solve the technical problems. A one-way valve I can guide external air into a bottle body and make the external air located above a liquid level, which avoids mixing between the air and milk, prevents colic of a baby, and maintains a balance between an internal pressure and an external pressure of the baby bottle. A one-way valve II can prevent the milk from flowing back into an air guide pipe when the baby bottle tilts and achieve an anti-leakage effect.

Technical solutions of the present disclosure are as follows:

An anti-colic baby bottle includes a bottle body and a nipple mounted at an open end of the bottle body through a threaded fixing ring; a thickened portion is arranged on one side of the nipple close to the bottle body; an anti-colic separation sheet is arranged between the bottle body and the nipple; the bottle body (1) together with the separation sheet (4) defines a milk storage cavity and the nipple (2) together with the separation sheet (4) defines a negative pressure cavity, an air inlet is formed in the thickened portion of the nipple; the anti-colic separation sheet is connected with an air guide pipe which correspondingly adapts to the air inlet and extends into the bottle body; the air guide pipe and a sucking end of the nipple are symmetrically arranged on two sides of the bottle body in a radial direction; a top end of the air guide pipe facing the air inlet is connected to the air inlet through a one-way valve I; and a bottom end of the air guide pipe located in the bottle body is connected with a one-way valve II.

Much further, the anti-colic separation sheet separates a first in the bottle body from a second cavity in the nipple; an upper end surface of the anti-colic separation sheet facing the thickened portion is provided with a boss protruding from the upper end surface of the anti-colic separation sheet; a through hole communicated with the air inlet is formed in a central axis of the boss; and the air guide pipe and a bottom of the boss are integrally formed and communicated.

Much further, the one-way valve I includes a valve plate arranged in the air inlet and a valve seat arranged at a top of the boss; the boss and the valve seat are both wrapped in the thickened portion and extend towards the air inlet; the valve seat is provided with a groove communicated with the through hole of the boss; the valve plate is plugged into the groove in a crossing manner; and the valve plate and the nipple are integrally formed.

Much further, the one-way valve II includes a sleeve hermetically sleeving a periphery of a bottom end of the air guide pipe; a flow back channel extending along a central axis of the air guide pipe is arranged at a position of the sleeve corresponding to a bottom of the air guide pipe; the sleeve and the flow back channel are integrally formed; the flow back channel includes an extending portion and a through hole portion which are communicated in sequence, and a central axis of the extending portion overlaps a central axis of the through hole portion; the extending portion is close to the air guide pipe and is hermetically plugged into an inner circumferential wall of the air guide pipe; the extending portion is correspondingly communicated with an internal channel of the air guide pipe; the through hole portion is located at one end away from the air guide pipe; the through hole portion communicates the first cavity in the bottle body with the flow back channel; and a blocking ball for blocking a through hole in a bottom of the through hole portion is arranged in the through hole portion.

Much further, a ball stop portion is further connected between the extending portion and the through hole portion; the ball stop portion includes a guide plate which is in arc transition connection with the through hole portion, and a limiting slot connected to the guide plate; the limiting slot is arranged in a manner of protruding towards an outer side wall of the sleeve; the limiting slot matches a radian of a peripheral edge of the blocking ball; the blocking ball rolls between the limiting slot and the through hole portion via the guide plate; an avoiding hole communicated with the extending portion and the through hole portion is formed in a central axis direction of the limiting slot; and a diameter of the avoiding hole is less than a diameter of the blocking ball.

Much further, a drainage slot sunken into the sleeve is formed in a side wall of the sleeve corresponding to the through hole portion; and the drainage slot is located in a space between the flow back channel and the outer side wall of the sleeve.

Much further, the anti-colic baby bottle includes two or more drainage slots; and the two or more drainage slots are uniformly distributed in an axial direction of the sleeve in a spacing manner.

The working principle and beneficial effects of the present disclosure are as follows:

1. According to the anti-colic baby bottle of the present disclosure, the one-way valve I can guide external air into the bottle body and make the external air located above the liquid level, which avoids mixing between the air and the milk, prevents colic of a baby, and maintains a balance between an internal pressure and an external pressure of the baby bottle. The one-way valve II can prevent the milk from flowing back into the air guide pipe when the baby bottle tilts and achieve an anti-leakage effect.
2. According to the anti-colic baby bottle of the present disclosure, in a process that the baby bottle gradually tilts, the air guide pipe gradually rises above the milk level. When the baby bottle has a relatively small inclination angle, it is hard for the blocking ball to overcome its gravity, and the blocking ball still blocks the through hole of the through hole portion. In this case, air does not enter the milk. When the inclination angle of the baby bottle enables the blocking ball to overcome its gravity, the air guide pipe has already completely rose above the milk level, and the blocking ball leaves the through hole portion and rolls into the limiting slot via the guide plate. The air in the air guide pipe enters the space above the milk level of the bottle body through the flow back channel to maintain a balance between the internal pressure and the external pressure of the bottle body and to prevent the milk from flowing back into the air guide pipe, achieving an anti-leakage effect.
3. According to the anti-colic baby bottle of the present disclosure, the one-way valve II can prevent the milk from entering the air guide pipe to cause breeding of bacteria and difficult cleaning. During cleaning, only the sleeve needs to be removed for thorough cleaning, and the air guide pipe is simply washed, so that the workload is reduced.

BRIEF DESCRIPTION OF THE DRAWINGS

The present disclosure is further described in detail below in combination with the accompanying drawings and specific implementations.

Figure 1:
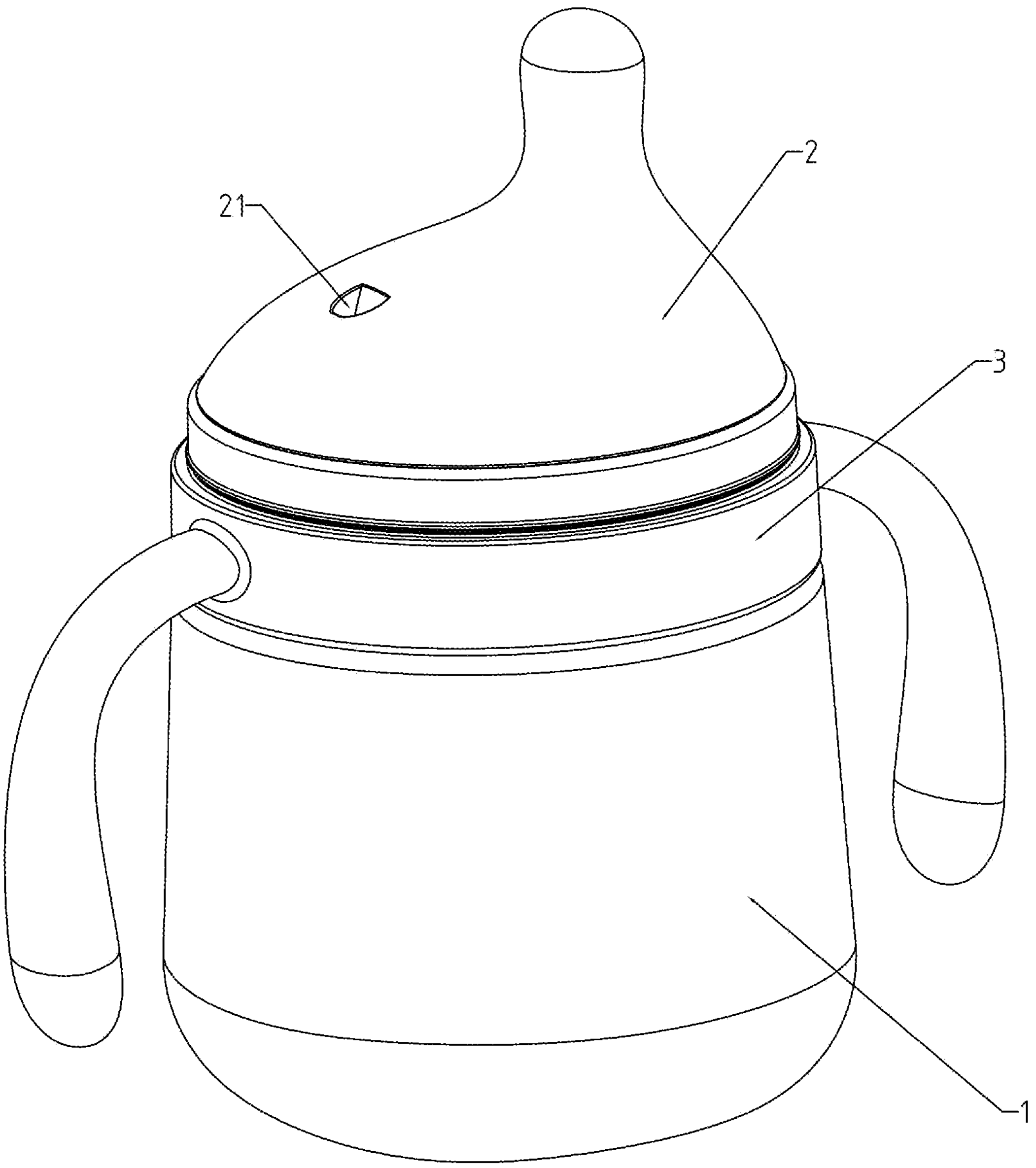
FIG. 1 is a schematic structural diagram of an anti-colic baby bottle according to the present disclosure.

In the drawings: 1: bottle body; 2: nipple; 21: air inlet; 22: thickened portion; 3: threaded fixing ring; 4: anti-colic separation sheet; 41: boss; 5: air guide pipe; 6: one-way valve I; 61: valve plate; 62: valve seat; 63: groove; 7: one-way valve II; 71: sleeve; 72: extending portion; 73: limiting slot; 74: avoiding hole; 75: guide plate; 76: through hole portion; 77: blocking ball; and 78: drainage slot.

DETAILED DESCRIPTION OF THE EMBODIMENTS

The technical solutions in the embodiments of the present disclosure will be described clearly and completely below with reference to the embodiments of the present disclosure. Clearly, the embodiments described herein are only part of the embodiments of the present disclosure, not all the embodiments. Based on the embodiments in the present disclosure, all other embodiments obtained by those of ordinary skill in the art without creative work shall fall within the protection scope of the present disclosure.

The fixed connection mentioned in this device refers to fixation through welding, threads, and other methods. Different fixing manners are used according to different usage environments. The rotatable connection refers to axial fixation and rotation of a bearing is achieved by shrink the bearing on a shaft and using an elastic collar. The slidable connection refers to connection through sliding of a sliding block in a sliding chute. The hinged connection refers to movable connection performed through a pin shaft and a short shaft, and all positions to be sealed are sealed using sealing rings or O rings.

Figure 2:
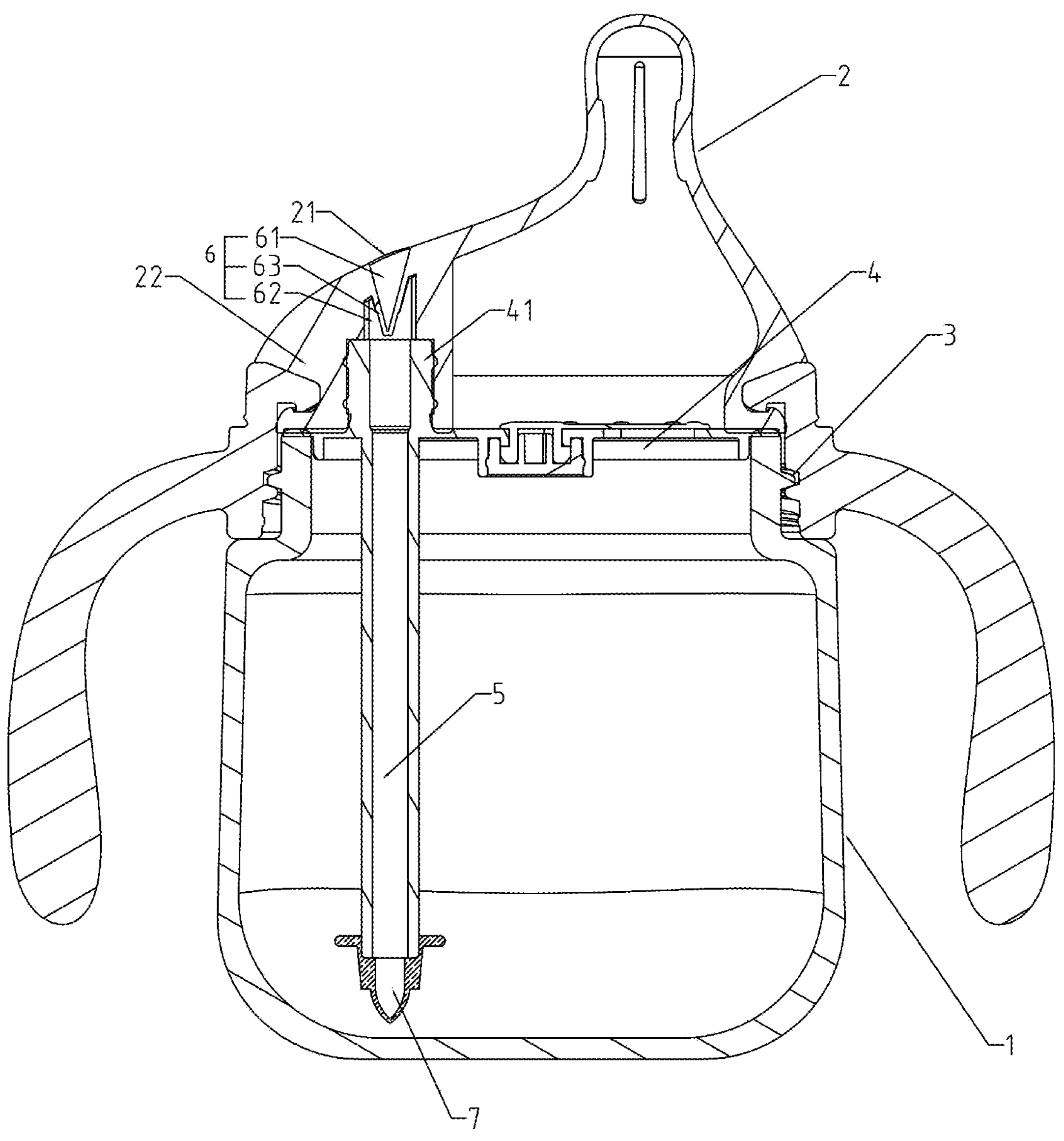
FIG. 2 is a sectional view of an anti-colic baby bottle according to the present disclosure.

An anti-colic baby bottle of this embodiment, as shown in FIG. 1 and FIG. 2, includes a bottle body 1 and a nipple 2 mounted at an open end of the bottle body 1 through a threaded fixing ring 3. The nipple 2 includes a second cavity, a thickened body, and a sucking end. The sucking end is communicated with the second cavity. The second cavity is located in the nipple 2, and a periphery of the second cavity is surrounded by the thickened body. A thickened portion 22 is arranged on one side of the nipple 2 close to the bottle body 1. The thickened portion 22 is located on one side deviated from a central axis of the bottle body 1 and occupies ⅔ of the thickened portion. The thickened portion 22 abuts against and presses an upper ring of the threaded fixing ring 3. The thickened portion 22 of the nipple 2 is deviated from the central axis of the bottle body 1. An air inlet 21 is formed in the thickened portion 22. The sucking end of the nipple 2 and the air inlet 21 are symmetrically distributed on two sides of the central axis of the bottle body 1, that is, a distance from the sucking end of the nipple 2 to the central axis of the bottle body 1 and a distance from the air inlet 21 to the central axis of the bottle body 1 are equal, and the sucking end and the air inlet 21 have opposite directions. A center point of a connecting line between the sucking end and the air inlet 21 is located on the central axis of the bottle body 1.

An anti-colic separation sheet 4 for separating the nipple 2 from the bottle body 1 is arranged between the bottle body 1 and the nipple 2. The anti-colic separation sheet 4 separates a first cavity in the bottle body 1 from a second cavity in the nipple 2. A part, corresponding to the second cavity of the nipple, of the anti-colic separation sheet 4 is provided with a first one-way valve component disclosed in claims 1 to 10 of a dual anti-colic baby bottle of patent application No. 202221910798X and used for guiding milk in the bottle body to the second cavity; and a locking mechanism, so that the milk is concentrated into the second cavity and is prevented from flowing back.

An upper end surface of the anti-colic separation sheet 4 facing the thickened portion 22 is provided with a boss 41 protruding from the upper end surface of the anti-colic separation sheet 4. A through hole communicated with the air inlet 21 is formed in a central axis of the boss 41. An air guide pipe 5 and a bottom of the boss 41 are integrally formed and communicated. The anti-colic separation sheet 4 is connected with the air guide pipe 5 which correspondingly adapts to the air inlet 21 and extends into the bottle body 1, that is, the air guide pipe is located right below the air inlet. A top end of the air guide pipe 5 facing the air inlet 21 is connected to the air inlet 21 through a one-way valve I 6. A bottom end of the air guide pipe 5 located in the bottle body 1 is connected with a one-way valve II 7. Specifically, the one-way valve I 6 includes a valve plate 61 arranged in the air inlet 21 and a valve seat 62 arranged at a top of the boss 41. The boss 41 and the valve seat 62 are both wrapped in the thickened portion 22 and extend towards the air inlet 21. The valve seat 62 is provided with a groove 63 communicated with the through hole of the boss 41. The valve plate 61 is paired and plugged into the groove 63 in a crossing manner. In a regular state, the valve plates abut against and press each other to avoid intrusion of external foreign matters. The valve plate 61 and the nipple 2 are integrally formed, that is, the valve plate 61, the valve seat 62, the boss 41, and the air guide pipe 5 all overlap at their central axes and are communicated with the air inlet 21. Air enters the bottle body 1 through the valve plate 61, the valve seat 62, the boss 41, and the air guide pipe 5 in sequence via the air inlet 21. During sucking, a negative pressure is generated in the baby bottle, and the milk flows out of the nipple. External air enters the bottle body 1 from the air inlet 21 via the one-way valve I 6. After entering the bottle body 1, the air is guided by the air guide pipe 5 to a position above a liquid level, avoiding mixing between the air and the milk and preventing the colic of a baby.

Figure 3:
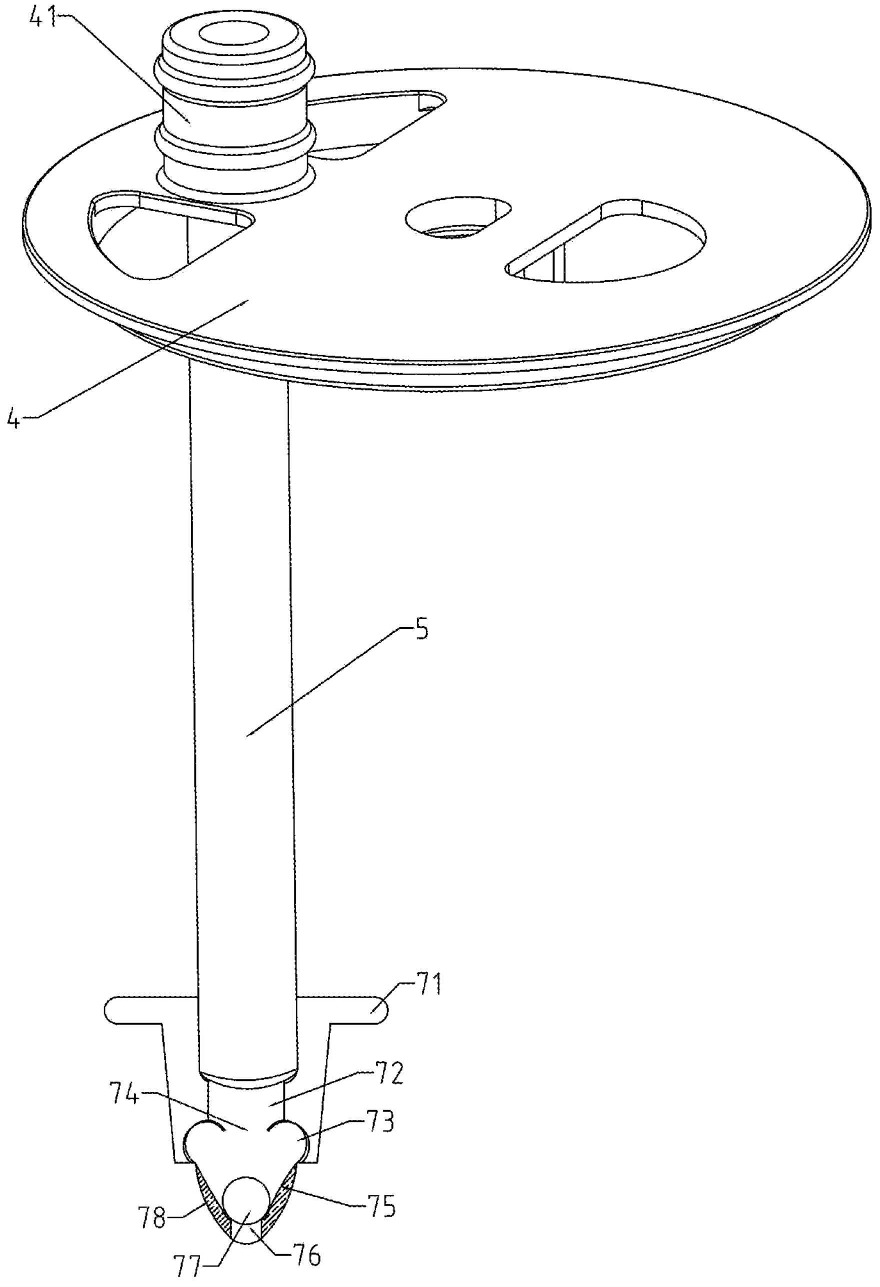
FIG. 3 is a schematic diagram of a one-way valve II of an anti-colic baby bottle according to the present disclosure.

Referring to FIG. 3, the one-way valve II 7 includes a sleeve 71 hermetically sleeving a periphery of a bottom end of the air guide pipe 5. The sleeve 71 can be mounted on the air guide pipe 5 in a plugged manner, which facilitates removal and cleaning. A flow back channel extending along the central axis of the air guide pipe 5 is arranged at a position of the sleeve 71 corresponding to a bottom of the air guide pipe 5. The sleeve 71 and the flow back channel are integrally formed. The flow back channel includes an extending portion 72 and a through hole portion 76 which are communicated in sequence, and a central axis of the extending portion overlaps a central axis of the through hole portion. The extending portion 72 is close to the air guide pipe 5 and is hermetically plugged into an inner circumferential wall of the air guide pipe 5. The extending portion 72 is correspondingly communicated with an internal channel of the air guide pipe 5. The through hole portion 76 is located at one end away from the air guide pipe 5. The through hole portion 76 communicates the milk storage cavity in the bottle body 1 with the flow back channel. A blocking ball 77 for blocking a through hole in a bottom of the through hole portion 76 is arranged in the through hole portion 76. When the baby bottle is uprightly placed, the blocking ball 77 blocks the through hole of the through hole portion 76 to avoid air from entering the bottle body via the guide pipe. When the baby bottle gradually tilts from the upright state, as an inclination angle of the baby bottle increases, the blocking ball 77 gradually overcomes its gravity and leaves the through hole portion 76, and air is guided into the bottle body 1 through the though hole portion 76 to maintain a balance between an internal pressure and an external pressure of the baby bottle, which ensures that the milk in the baby bottle can be normally sucked out.

A ball stop portion is further connected between the extending portion 72 and the through hole portion 76. The ball stop portion includes a guide plate 75 which is in arc transition connection with the through hole portion 76, and a limiting slot 73 connected to the guide plate 75. The limiting slot 73 is arranged in a manner of protruding towards an outer side wall of the sleeve 71. The limiting slot 73 matches a radian of a peripheral edge of the blocking ball 77 to form an accommodating space for accommodating the blocking ball 77. Meanwhile, when the baby bottle tilts, the blocking ball 77 is prevented from rolling out of the limiting slot 73. The blocking ball 77 rolls between the limiting slot 73 and the through hole portion 76 via the guide plate 75. An avoiding hole 74 communicated with the extending portion 72 and the through hole portion 76 is formed in a central axis direction of the ball stop portion. A diameter of the avoiding hole 74 is less than a diameter of the blocking ball 77. That is, the limiting slot 73 protrudes towards the outer side wall of the sleeve 71 along a circumferential direction of the extending portion 72 to form a placement space for placing the blocking ball 77. Moreover, without affecting the air from entering the extending portion 72 via the air guide pipe 5 and flowing into the bottle body 1 through the avoiding hole 74 and the through hole portion 76, a proper weight range and a proper material can be selected for the blocking ball according to limited tests of a person skilled in the art, a diameter and height of the baby bottle, and a hole diameter and length of the air guide pipe. This is the prior art, so that when the air guide pipe does not completely rise above the milk level, the blocking ball does not leave the through hole portion and still blocks the through hole, to avoid the milk from entering the air guide pipe.

A drainage slot 78 sunken into the sleeve 71 is formed in a side wall of the sleeve 71 corresponding to the through hole portion 76. The drainage slot 78 is located in a space between the flow back channel and the outer side wall of the sleeve 71. In a process that the baby bottle gradually tilts, the air guide pipe 5 gradually rises above the milk with the tilting of the baby bottle. During the tilting, it is inevitably that some milk will enter the air guide pipe 5. The drainage slot 78 is added at the bottom of the sleeve 71, so that the milk is first drained into the drainage slot 78, which avoids the milk from entering the air guide pipe 5 to cause bacteria breeding and make it difficult to clean. For cleaning, the drainage slot 78 and the blocking ball 77 are brushed for cleaning by just removing the sleeve 71, and the air guide pipe 5 is simply washed, so that the workload is reduced.

In the process that the baby bottle gradually tilts, the air guide pipe 5 gradually rises above the milk level. When the baby bottle has a relatively small inclination angle, it is hard for the blocking ball 77 to overcome its gravity, and the blocking ball still blocks the through hole of the through hole portion 76. In this case, air does not enter the milk. When the inclination angle of the baby bottle enables the blocking ball 77 to overcome its gravity, the air guide pipe 5 has already completely rose above the milk level, and the blocking ball 77 leaves the through hole portion 76 and rolls into the limiting slot 73 via the guide plate 75. The air in the air guide pipe 5 enters the space above the milk level of the bottle body 1 through the flow back channel to maintain a balance between the internal pressure and the external pressure of the bottle body 1 and to prevent the milk from flowing back into the air guide pipe 5, achieving an anti-leakage effect.

The above descriptions are only the preferred embodiments of the present disclosure, and are not intended to limit the present disclosure. Any modifications, equivalent replacements and improvements that are made within the spirit and principle of the present disclosure shall fall within the protection scope of the present disclosure.

What is claimed is:

1. An anti-colic baby bottle, comprising a bottle body (1) and a nipple (2) mounted at an open end of the bottle body (1) through a threaded fixing ring (3), wherein a thickened portion (22) is arranged on one side of the nipple (2) close to the bottle body (1); an anti-colic separation sheet (4) is arranged between the bottle body (1) and the nipple (2) to divide the baby bottle into two cavities, one of the two cavities is in the bottle body (1) and another of the two cavities is in the nipple (2); an air inlet (21) is formed in the thickened portion (22) of the nipple (2); the anti-colic separation sheet (4) is connected with an air guide pipe (5) which correspondingly adapts to the air inlet (21) and extends into the bottle body (1); the air guide pipe (5) and a sucking end of the nipple (2) are symmetrically arranged on two sides of the bottle body (1) in a radial direction; a top end of the air guide pipe (5) facing the air inlet (21) is connected to the air inlet (21) through a one-way valve I (6); and a bottom end of the air guide pipe (5) located in the bottle body (1) is connected with a one-way valve II (7).

2. The anti-colic baby bottle according to claim 1, wherein an upper end surface of the anti-colic separation sheet (4) facing the thickened portion (22) is provided with a boss (41) protruding from the upper end surface of the anti-colic separation sheet (4); a through hole communicated with the air inlet (21) is formed in a central axis of the boss (41); and the air guide pipe (5) and a bottom of the boss (41) are integrally formed and communicated.

3. The anti-colic baby bottle according to claim 2, wherein the one-way valve I (6) comprises a valve plate (61) arranged in the air inlet (21) and a valve seat (62) arranged at a top of the boss (41); the boss (41) and the valve seat (62) are both wrapped in the thickened portion (22) and extend towards the air inlet (21); the valve seat (62) is provided with a groove (63) communicated with the through hole of the boss (41); the valve plate (61) is plugged into the groove (63) in a crossing manner; and the valve plate (61) and the nipple (2) are integrally formed.

4. The anti-colic baby bottle according to claim 1, wherein the one-way valve II (7) comprises a sleeve (71) hermetically sleeving a periphery of a bottom end of the air guide pipe (5); a flow back channel extending along a central axis of the air guide pipe (5) is arranged at a position of the sleeve (71) corresponding to a bottom of the air guide pipe (5); the sleeve (71) and the flow back channel are integrally formed; the flow back channel comprises an extending portion (72) and a through hole portion (76) which are communicated in sequence, and a central axis of the extending portion overlaps a central axis of the through hole portion; the extending portion (72) is close to the air guide pipe (5) and is hermetically plugged into an inner circumferential wall of the air guide pipe (5); the extending portion (72) is correspondingly communicated with an internal channel of the air guide pipe (5); the through hole portion (76) is located at one end away from the air guide pipe (5); the through hole portion (76) communicates the one of the two cavities with the flow back channel; and a blocking ball (77) for blocking a through hole in a bottom of the through hole portion (76) is arranged in the through hole portion (76).

5. The anti-colic baby bottle according to claim 4, wherein a ball stop portion is further connected between the extending portion (72) and the through hole portion (76); the ball stop portion comprises a guide plate (75) which is in arc transition connection with the through hole portion (76), and a limiting slot (73) connected to the guide plate (75); the limiting slot (73) is arranged in a manner of protruding towards an outer side wall of the sleeve (71); the limiting slot (73) matches a radian of a peripheral edge of the blocking ball (77); the blocking ball (77) rolls between the limiting slot (73) and the through hole portion (76) via the guide plate (75); an avoiding hole (74) communicated with the extending portion (72) and the through hole portion (76) is formed in a central axis direction of the ball stop portion; and a diameter of the avoiding hole (74) is less than a diameter of the blocking ball (77).

6. The anti-colic baby bottle according to claim 5, wherein a drainage slot (78) sunken into the sleeve (71) is formed in a side wall of the sleeve (71) corresponding to the through hole portion (76); and the drainage slot (78) is located in a space between the flow back channel and the outer side wall of the sleeve (71).

7. The anti-colic baby bottle according to claim 6, wherein the anti-colic baby bottle comprises two or more drainage slots (78); and the two or more drainage slots (78) are uniformly distributed in an axial direction of the sleeve (71) in a spacing manner.

* * * * *